June 17, 1924.

R. E. SWANSON

OPHTHALMIC MOUNTING

Filed Feb. 2, 1921

1,498,249

Inventor

Rudolph E. Swanson

By Howard E. Barlow

Attorney

Patented June 17, 1924.

1,498,249

UNITED STATES PATENT OFFICE.

RUDOLPH E. SWANSON, OF RIVERSIDE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed February 2, 1921. Serial No. 441,808.

*To all whom it may concern:*

Be it known that I, RUDOLPH E. SWANSON, a citizen of the United States, residing at Riverside, in the county of Providence and State of Rhode Island, have invented certain new and useful Improvements in Ophthalmic Mountings, of which the following is a specification.

The present invention relates to spectacle temples of the combined-metal-and-non-metallic type, and to methods of making the same, and it has for its object to provide a new and improved temple of the said type that shall have the property of flexibility.

With the above end in view, the invention consists of the improved spectacle temple and method of making the same hereinafter described, illustrated in the accompanying drawings and defined in the appended claims.

Figure 1:
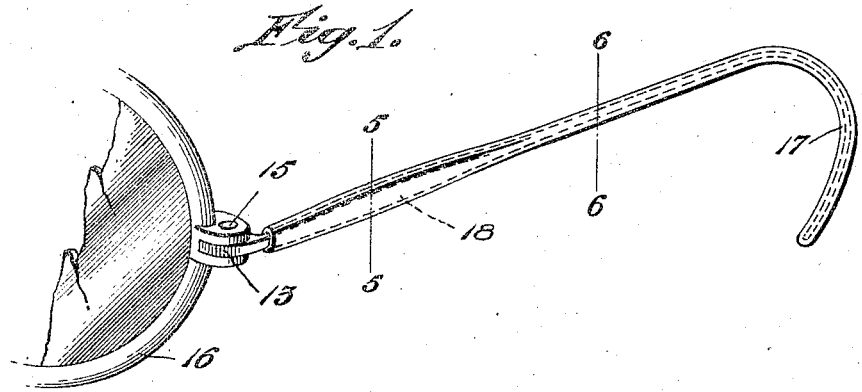
Figure 2:
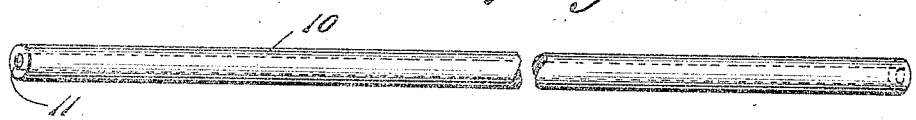
Figure 3:
Figure 4:
Figure 6:
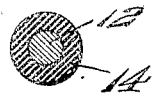
Figure 5:

In the drawings, Fig. 1 is a perspective view of a temple constructed according to a preferred embodiment of the present invention, shown hinged to a lens frame; Fig. 2 is a view of a non-metallic tube adapted to be combined with a metal rod to form a temple according to a preferred embodiment of the present invention; Fig. 3 is a plan of a prior-art metal rod or core that is adapted to be combined with the non-metallic tube of Fig. 2; Fig. 4 is an elevation illustrating the core of Fig. 3 as provided at one end with a temple end piece or hinge member whereby the temple may be hinged to the lens frame, the non-metallic tube being shown in dotted lines; Fig. 5 is an enlarged section on the line 5—5 of Fig. 1, through the flattened portion of the temple; and Fig. 6 is an enlarged section on the line 6—6 of Fig. 1, through the cylindrical portion of the temple.

Temples have hitherto been made of seamless tubes 10 constituted of celluloid, zylonite or other pliable, non-metallic substances, in the bores 11 of which have been mounted reinforcing wire cores 12. Such prior-art temples, illustrated in Fig. 4, are stiff and unyielding.

To render the temple flexible, according to the present invention, the rod 12 is first made flexible prior to its assembly with the tube 10. As the flexibility is most needed at the forward portion 18 of the temple, it is the forward portion of the rod 12 that is endowed with flexibility. The preferred method of rendering the forward portion of the rod 12 flexible is to flatten it, as will be understood from Figs. 1 and 5. The rod is thus rendered flexible in a direction transverse to the plane of the flattened portion. The effect of this flexibility would be lost in part, after the rod has been mounted in the tube 10, as shown in Fig. 4. To impart greater flexibility to the completed temple, therefore, the forward portion of the tube is correspondingly flattened, as shown in Figs. 1 and 5. This flattening may be effected in any desired way, as by means of heated dies.

The temple of the present invention is readily flexible about its forward portion in a direction towards and from the side of the face of the wearer, and is a marked improvement over the stiff, unflexible temples in use at the present day.

In some cases, the wire may be gold filled, while in other cases it may be of a base metal, thus reducing the cost of the material. On the forward end of the wire is formed or connected a butt or joint portion 13 which is left extending beyond the end 14 of the non-metallic tube. The butt is made in the desired shape to be hinged, as at 15, to the lens frame 16.

In some instances, I employ a wire of a size sufficient to have the butt swaged thereon and I subsequently place the body of the wire in a reducing machine and draw the body portion out to a small diameter, which is passed through the bore of the tube. In other instances, I employ a base-metal wire drawn to the desired size to be passed through the bore of the desired size of casing, and to the base-metal core I connect by solder or otherwise the heavier butt or hinged end of the desired size and construction, and having a precious-metal outer surface. An ophthalmic mounting is thus produced comprising a non-metallic member and a reinforcing member partly concealed by the non-metallic member, most of the concealed portion of the metal member being constituted of base metal, and the surface of the unconcealed portion of the metal member being constituted of precious metal.

In both instances, before inserting the wire into the bore of the casing, I first cover the wire with a suitable cement which is especially constructed for causing the metal to adhere to the celluloid.

After the wire has been inserted into the tube, the rear portion 17 of the composite temple may then be bent into loop form, as illustrated in Fig. 1, to be passed over the ear of the wearer, which bending operation may be effected without subjecting the tube to heat. The non-metallic tube and the metal core will together be permanently retained in any bent position, without any tendency to straighten out.

My improved temple is extremely simple and inexpensive in construction, as the standard or stock tubular celluloid may be employed for the casing, and a standard size of base metal wire may be used as a core thereby reducing the cost of construction to the minimum.

Having thus described one illustrative embodiment of my invention and the best mode known to me for carrying out my method, I desire it to be understood that although specific terms are employed, they are used in a generic and descriptive sense and not for the purpose of limitation, the scope of the invention being defined and limited only by the appended claims.

I claim:

1. A spectacle temple comprising a seamless non-metallic tube and a reinforcing rod mounted within the tube, the rear portion of the tube with the reinforcing rod mounted therein being bent to the shape of a temple, and the temple being flexible at the forward portion and adapted to be hinged at the forward end.

2. A spectacle temple comprising a seamless non-metallic tube and a reinforcing rod mounted within the tube, the rear portion of the tube with the reinforcing rod mounted therein being bent to the shape of a temple, the forward portion of the rod being flattened to render it flexible, the forward portion of the tube being correspondingly flattened, and the temple being adapted to be hinged at the forward end.

3. A spectacle temple comprising a seamless non-metallic tube and a reinforcing rod mounted within the tube and having a hinge member extending forward beyond the tube, the rear portion of the tube with the reinforcing rod mounted therein being bent to the shape of a temple, the forward portion of the rod being flattened to render it flexible, the forward portion of the tube being correspondingly flattened, and the temple being adapted to be hinged by means of the hinge member.

4. The method of making a spectacle temple adapted to be hinged at the forward end that comprises mounting a reinforcing rod the forward portion of which is flattened to render it flexible within a seamless non-metallic tube, and bending the rear portion of the tube with the reinforcing rod enclosed therein to the shape of a temple.

5. The method of making a spectacle temple adapted to be hinged at the forward end that comprises mounting a reinforcing rod the forward portion of which is flattened to render it flexible within a seamless non-metallic tube, correspondingly flattening the forward portion of the tube, and bending the rear portion of the tube with the reinforcing rod enclosed therein to the shape of a temple.

6. An ophthalmic mounting comprising a non-metallic member and a metal reinforcing member partly concealed by the non-metallic member, most of the concealed portion of the metal member being constituted of base metal, and the surface of the unconcealed portion of the metal member being constituted of precious metal.

7. An ophthalmic mounting comprising a seamless non-metallic tube and a reinforcing rod in the tube, most of the portion of the rod within the tube being constituted of base metal, and the surface of the portion of the rod without the tube being constituted of precious metal.

In testimony whereof I affix my signature.

RUDOLPH E. SWANSON.